United States Patent
Al-Malaika et al.

(10) Patent No.: US 8,889,239 B2
(45) Date of Patent: Nov. 18, 2014

(54) STABILISED CROSS-LINKED POLYMERS

(75) Inventors: Sahar Al-Malaika, Sulton Coldfield (GB); Cezary Lewucha, Mikstat (PL)

(73) Assignee: Aston University, Birmingham (GB)

( * ) Notice: Subject to any disclaimer, the term of this patent is extended or adjusted under 35 U.S.C. 154(b) by 147 days.

(21) Appl. No.: 13/575,245

(22) PCT Filed: Jan. 28, 2011

(86) PCT No.: PCT/GB2011/000114
§ 371 (c)(1),
(2), (4) Date: Jul. 25, 2012

(87) PCT Pub. No.: WO2011/092476
PCT Pub. Date: Aug. 4, 2011

(65) Prior Publication Data
US 2012/0295048 A1 Nov. 22, 2012

(30) Foreign Application Priority Data

Jan. 29, 2010 (GB) .................................. 1001537.8

(51) Int. Cl.
| | |
|---|---|
| *B29D 22/00* | (2006.01) |
| *B29D 23/00* | (2006.01) |
| *B32B 1/08* | (2006.01) |
| *C08F 255/02* | (2006.01) |
| *F16L 9/127* | (2006.01) |
| *C08F 285/00* | (2006.01) |
| *F16L 9/147* | (2006.01) |
| *C08K 5/134* | (2006.01) |
| *C08K 5/3435* | (2006.01) |
| *C08K 5/1545* | (2006.01) |

(52) U.S. Cl.
CPC ............. *C08F 255/02* (2013.01); *C08K 5/1345* (2013.01); *C08K 5/3435* (2013.01); *C08K 5/1545* (2013.01); *F16L 9/127* (2013.01); *C08F 285/00* (2013.01); *F16L 9/147* (2013.01)
USPC .......... 428/36.9; 428/35.7; 525/303; 525/242; 522/129; 522/116; 522/125

(58) Field of Classification Search
CPC ....... C08F 255/02; C08F 255/00; B32B 1/08; C08J 3/24; C08J 3/28; B29D 22/00; B29D 23/00
USPC .......... 428/35.7, 36.9; 525/303, 242; 522/129, 522/116, 125
See application file for complete search history.

(56) References Cited

U.S. PATENT DOCUMENTS

| | | | |
|---|---|---|---|
| 4,354,007 | A | 10/1982 | Scott |
| 4,743,657 | A | 5/1988 | Rekers et al. |
| 4,956,410 | A | 9/1990 | Scott et al. |
| 5,098,957 | A | 3/1992 | Scott et al. |
| 5,122,555 | A | 6/1992 | Scott et al. |
| 5,382,633 | A | 1/1995 | Scott et al. |
| 2004/0045619 | A1 | 3/2004 | Backman et al. |
| 2008/0226858 | A1 | 9/2008 | Walter et al. |

FOREIGN PATENT DOCUMENTS

| | | |
|---|---|---|
| GB | 1283103 | 7/1972 |
| GB | 1358443 | 7/1974 |
| GB | 2410308 | 7/2005 |
| JP | 02-185549 | 7/1990 |
| WO | 96/41824 | 12/1996 |
| WO | 2005/063896 | 7/2005 |

OTHER PUBLICATIONS

Augustsson, Ann-Christin et al., "The role of grafting and network formation on the extractability of antioxidants in crosslinked polyethylene," Polymerdagarna, Goteborg, Sweden, Aug. 17-19, 2005 (extract from conference, abstract only).
Tsunaga, M., et al., "Cross-linked polyethylene pipe for hot water and geothermal applications Reliability and fusion technology," International conference on Plastics Pipes No. 10, Goteborg, Sweden, 1998, vol. 277, No. 10 (480) (5 ref.), pp. 460-464.
Chen, Yong Lie, et al., "Photocrosslinking of Polyethylene, III. Thermal Oxidative Stability of Photocrosslinked Polyethylene," Journal of Polymer Science: Part A: Polymer Chemistry, vol. 28, pp. 1847-1859, (1990).
"PEX-a Tubing-Why It's Better," Uponor Radiant Heating, plumbing and fire protection systems fact sheet, 2006, Uponor Canada.
Abstract from Ciba Presentation (2005), 5 pages.
International Search Report and Written Opinion from International Application No. PCT/GB2011/000114, Apr. 4, 2011.

*Primary Examiner* — Michael C Miggins
(74) *Attorney, Agent, or Firm* — Calfee, Halter & Griswold, LLP

(57) ABSTRACT

The present invention is concerned with the process for preparing a cross-linked stabilized polymer composition using at least one graftable polymer stabilizer, and the subsequent use of that composition for forming pipes, for example PEX pipes. The graftable stabilizer becomes anchored to the polymer such that stabilizer activity is retained in the cross-linked product. Cross-linking can be achieved by conventional processes such as PEXa, PEXb and PEXc. Embodiments demonstrate excellent levels of antioxidant retention (as measured by oxidative induction retention after exhaustive solvent extraction) and the cross-linked product are suitable for portable water applications, including hot water applications.

32 Claims, No Drawings

STABILISED CROSS-LINKED POLYMERS

CROSS REFERENCE TO RELATED APPLICATIONS

This application is the U.S. national phase entry of PCT/GB11/000114 with an international filing date of Jan. 28, 2011, which claims the benefit of British Patent Application No. 1001537.8, filed on Jan. 28, 2010, the entire disclosures of which are incorporated herein by reference.

FIELD OF THE INVENTION

The present invention relates to stabilised cross-linked vinyl-based polymer compositions and their use for making cross-linked polyethylene (PEX) pipes used in applications including water distribution systems.

BACKGROUND TO THE INVENTION

Polyvinyl chloride, and various types of polyolefins, especially polyethylenes, are typical polymers used in diverse pipe applications, including transportation of gas such as natural gas, and liquids including domestic cold and hot water, waste water and sewers, as well as uses for water solar systems, floor and radiant heating systems. Cross-linked polyethylene (PEX) pipes are used extensively in portable cold and hot water and domestic and commercial heating applications.

Cross-linked polyethylene pipes, PEX, offer a number of advantages compared to those made from non-cross-linked materials including good heat deformation resistance, increased mechanical strength, stiffness, hardness, and improved abrasion and environmental stress crack resistance, and good high temperature strength.

However, under extreme conditions of use, even PEX pipes have the opportunity for further improvement. For example for domestic portable water, particularly in hot (up to 90° C.) water distribution applications, pipes are subjected to various thermal stresses resulting in creation of severe extractive environment and reduced thermal oxidative resistance. Further potential problems for polyolefin pipes are associated with the presence of oxidising agents, other than oxygen of the environment, such as chlorine and hypochlorous acid which are typically used as disinfectants in water treatment to prevent the spread of infectious diseases. These oxidants can cause oxidative damage to the polymer resulting in possible early brittle fracture of the pipe.

Reduction of oxidative stability of plastics pipes therefore presents a potential problem in extreme conditions and is a decisive factor that is exacerbated in the presence of elevated temperatures, particularly under load, and extractive conditions, and this has a direct effect on reducing the service lifetime of the product.

It would be advantageous therefore to increase the thermo-oxidative stability of the piping material in order to protect against oxidative degradation by providing the polymer with increased processing (melt) stability and long term thermal stability during the lifetime of the hot water pipes which are typically designed for a 50 years lifetime including a significant safety factor.

In order to protect against oxidative degradation and improve the long term stability of polymer products including PEX pipes, they are generally stabilised by stabilisers and antioxidants which are typically incorporated during the manufacture of polymer products. Stabilisers (also known as antioxidants) are a group of compounds containing certain antioxidant functional groups (antioxidant functions) that are capable of interrupting the oxidative degradation process either by deactivation of the damaging free radicals, or by preventing or inhibiting the generation of initiating free radicals especially from peroxide decomposition. Examples of such antioxidant functions which may be utilised in the present invention are chain breaking antioxidant functions, notably hindered phenol, hindered aliphatic amine and aromatic amine functions, peroxide decomposing antioxidant functions including a variety of compounds containing sulfur- or phosphorous-functions, hydroxybenzophenones, transition metal-containing compounds, metal deactivating agents such as disalicylidine ethylene diamine.

However, it is known in the state of the art, that the use of stabilisers/antioxidants in cross-linked polymers, particularly in PEX, presents limitations and challenges. The concentration of antioxidants has been shown to be lower after cross-linking compared to their concentration before cross-linking resulting in decrease of product long term stability. The process of cross-linking interacts with the stabilisers/antioxidants resulting in the antioxidants being, at least partly, deactivated or consumed by the cross-linking process thus an adverse effect on long term stability and service life of the products.

Migration, leaching and loss of antioxidants/stabilisers from polyolefin polymers and to some extent PEX pipes when in contact with fluids such as hot water and other extractive liquids present another problem which can result in a decrease in the stabilising effectiveness of the antioxidant, embrittlement and premature failure of the product as well as giving rise to potential toxicity and hygiene issues when the product is involved in human-contact applications such as the case for pipes targeted for domestic portable water.

More generally, whilst the long term stability of a plastic material can easily be raised to high level, i.e. >100 min in an oxidative induction time (OIT) test, by simply adding larger amounts of stabiliser, this is not a viable technique when manufacturing goods that will be in contact with foodstuffs or portable water pipes because most stabilisers are known to easily migrate out of the matrix, especially when in touch with hot water. Thus, unnecessarily high stabiliser content can be harmful because the stabilisers themselves or their reaction products can have health issues when being diffused out of the system. Hence the amount of stabilisers should be minimised so that migration is reduced or prevented, if possible. Nevertheless, depending on the nature of the antioxidant (that is, the extent/level of its harmful effect), even modest concentrations of antioxidant can give rise to health issues due to migration.

Returning to the industrially important PEX materials, cross-linking of polyethylene is achieved by one of three methods: peroxide (PEXa), silane technology (PEXb) or electron beam (PEXc). Cross-linking of polymers is mainly a radical reaction which applies to most cross-linking processes.

The PEXa approach or "peroxide" method, involves typically the use of special high pressure extruders where chemical cross-linking of the polyethylene in the presence of a peroxide is achieved in the polymer melt during the high temperature manufacturing process. An example of a manufacturing method used for the PEXa process is the Engel method which provides good control of the degree of cross-linking resulting in a uniform product. Typically the degree of cross-linking in PEXa products is in the range 75-85%.

Examples of the PEXb approach are the Sioplas® and Monsil® methods, both of which are used commercially. In these methods, a secondary, post-extrusion process, is used so that cross-linking occurs after extrusion with the help of a catalyst and exposure of pipe to water (e.g. steam or hot water). In this way, cross-linking is provided by —Si—O—Si— bonds between the hydrocarbon polymer chains. Suitably the piping is flushed with water after cross-linking to remove contaminants. Typically the degree of cross-linking is in the range 65-70%.

An example of the third approach, PEXc, is electron irradiation, also known as "cold" cross-linking. Typically the tubing is bombarded with electrons after it has been extruded. In practice, the PE is extruded in the normal way and then moved to an E-beam facility and passed under an electron beam in an irradiation chamber where it is dosed with a controlled amount of radiation resulting in the cross-linking process. Typically the degree of cross-linking is in the range 70-75%.

A number of additional problems have been observed with these polyethylene cross-linking systems: in the peroxide process, peroxide residues are typically left in the polymer system and this could adversely affect polymer stability if pipe is not processed correctly; the electron beam process causes both cross-linking and chain scission which can be detrimental to stability as well as properties of the polymer.

SUMMARY OF THE INVENTION

The present invention provides a process for preparing a cross-linked stabilised polymer composition using at least one graftable stabiliser which reduces or overcomes the possible disadvantages and problems discussed above.

At its most general, the present invention proposes that at least one stabiliser in the polymer composition used in the manufacture of a cross-linked polyolefin or other thermoplastic polymer should be a graftable stabiliser. By using a graftable stabiliser in this way, suitably the cross-linked polymer of the finished product contains the stabiliser bonded to (grafted to) the polymer.

One aspect of the present invention provides a method of making a stabilised cross-linked polymer from a thermoplastic polymer, the method comprising grafting at least one polymer stabiliser on to the polymer and cross-linking the polymer to a degree of cross-linking of at least 25%.

In particular, a first embodiment of this method of the present invention provides a product of the method that is a cross-linked stabilised polymer wherein the stabiliser, which, as discussed herein, is any compound containing an antioxidant function, is retained within the polymer and there is little or no observable loss of stabiliser in the cross-linked product. This contrasts with the comparatively low levels of retention (high levels of leaching) of conventional/non-grafted stabiliser that is observed in conventional products, including to some extent PEX pipes.

As discussed below, such a cross-linked polymer product having high levels of stabiliser retention (little or no observable leaching) of stabiliser is also a further aspect of the present invention.

In another embodiment of the invention, the method provides cross-linked stabilised polymers wherein there is little or no observable loss of stabiliser during cross-linking of the polymer. This contrasts with the much higher loss (deactivation or consumption) of stabiliser in conventional processes for making stabilised cross-linked polymers, including to some extent PEX pipes.

In particular, in embodiments the present invention provides a process where the cross-linking step does not interfere with the grafted stabiliser. That is, embodiments exhibit low or no damage to the stabiliser as a result of the cross-linking step and this means that the majority or even substantially all of the stabiliser is retained in the polymer. Suitably at least 25%, preferably 50%, more preferably 75%, and most preferably greater than 80% of the stabiliser is retained in the cross-linked polymer. The amount of retained stabiliser can be calculated from spectroscopic measurements as discussed herein.

When a stabiliser has been grafted to the polymer (for example via reaction of an acryloyl group in a graftable portion of the stabiliser, as discussed in more detail below), the "active" stabiliser/antioxidant portion of the stabiliser will retain its stabiliser/antioxidant properties. That is, as demonstrated by the excellent levels of thermal oxidative stability achieved by the examples, anchoring of the stabiliser to the polymer still permits stabiliser/antioxidant activity. Indeed, generally the cross-linked polymer includes stabilisers grafted to the polymer so as to form pendant stabiliser groups.

As is clear from the examples herein, the stabiliser generally does not take part in cross-linking of the polymer, i.e. is non-bridging. Indeed, it is preferred that the cross-link "bridge" is provided substantially exclusively by direct bond formation between polymer chains (e.g. in the PEXa and PEXc processes where radicals are formed on adjacent polymer chains leading to C—C bond formation) or via a pre-selected cross-linking agent such as silane (e.g. in the PEXb process).

In tests, embodiments of the present invention have been shown to be efficiently stabilised and to exhibit good levels of long term thermal stability (LTTS) as measured by oxidative induction time (OIT).

This indicates that the stabilisers that are retained in the cross-linked polymer remain "active". This is very surprising because it is well known that the cross-linking process interferes with stabilisers resulting in at least their partial consumption and overall decreased oxidative stability of the product. Tests on embodiments in which the residual amount of stabiliser after cross-linking is measured reveal that not only can substantially all of the stabiliser can be accounted for in the polymer but that the graftable stabilisers remain bound to the cross-linked polymer. In other words the embodiments show substantially no loss of stabiliser from the product.

This is a significant advantage over conventional products and the excellent stabiliser retention in embodiments of the present invention mean that the products have advantages in terms of improvements to migration and toxicity and/or hygiene issues.

Whilst the method of the present invention can suitably be used to stabilise and cross-link any thermoplastic polymer, it is especially suited to vinyl polymers and copolymers including polyvinyl chloride, polystyrene, and preferably polyolefins and copolymers including polypropylene, ethylene-propylene co- and ter-polymers and more preferably polyethylene, especially HDPE (high density polyethylene), and also LDPE (low density polyethylene), LLDPE (linear low density polyethylene) and UHMWPE (ultra high molecular weight polyethylene).

The grafting and cross-linking of the polymer can occur sequentially (two steps) or at the same time (one step).

In a preferred embodiment the method is a two-step process wherein the grafting step occurs before the cross-linking step.

Thus, in one embodiment the invention provides a method of preparing a stabilised cross-linked polymer whereby in a first step (1) a process of free radical grafting of one or more stabilisers onto the polymer is conducted and in a second step (2), that is after the grafting step (1), a free radical-induced cross-linking process of the polymer containing the grafted stabilisers is carried out in the absence or presence of one or more other stabilisers (a two step process).

In another preferred embodiment the method is a one-step process wherein (1) grafting and (2) cross-linking occur in one step at substantially the same time.

Thus, in another embodiment, the invention provides a method for preparing a stabilised cross-linked polymer where both processes of grafting the stabiliser and cross-linking the polymer in the absence or presence of one or more additional stabilisers, occur in one step (a one step process).

For the two step process, preferably step (1) is carried out in a polymer melt suitably either in presence of added free radical generating agent such as organic peroxide or an azo compound or in presence of free radicals generated in-situ by the shearing of the polymer melt.

Preferably step (2) is carried out in a polymer melt suitably in the presence of a chemical, for example peroxide, or physical, for example e-beam, cross-linking agent.

Suitably steps (1) and (2) are carried out in a polymer melt (for example, sequentially).

Suitably step (1) and/or (2) take place at elevated temperature, typically above the melting temperature of the polymer. Depending on the polymer, a suitable temperature may be between 150 to 300° C. Suitably the temperature is at least 150° C., more preferably at least 200° C. and even more preferably at least 220° C. Typically an upper limit for the temperature is 300° C., preferably 270° C., more preferably 250° C. and most preferably about 240° C. A particularly preferred temperature is about 240° C.

In the one step process a preferred temperature would be higher than the melting temperature of the polymer and higher than the decomposition point of the organic peroxide, azo compound, or any other chemical cross-linking agent used to crosslink the polymer, and at a suitably high temperature above the melting temperature of the polymer if high energy irradiation is used for the cross-linking process. Suitable temperatures for the one step process are 150° C. to 300° C., more preferably 200° C. to 270° C., more preferably 220° C. to 260° C. and most preferably 230° C. to 250° C.

In the two step process a preferred temperature range for step (1) is 150° C. to 250° C., more preferably 170° C. to 230° C., more preferably 170° C. to 240° C., and most preferably 180° C. to 240° C. Suitably the preferred temperature range for step (2) is independently selected from the ranges given above for step (1).

In the case where steps (1) and (2) are carried out separately, a preferred temperature range for step (2) is 150° C. to 300° C., more preferably 200° C. to 270° C., more preferably 220° C. to 260° C. and most preferably 230° C. to 250° C.

The reaction time, temperature and pressure of the process depends on many factors including the type of polymer being treated, decomposition temperature of the chemical free radical generator when used, the method and type of equipment used to produce the grafting of the stabiliser and cross-linking of the polymer. The skilled reader is readily able to adopt suitable values for these parameters.

Suitably in the two step process of the present invention, the first step comprises preparing a polymer containing high concentration of graftable stabilisers prepared in the polymer melt in the presence of free radicals to give masterbatch concentrates of 1 to 30 g antioxidants/100 g polymer which can then be used as normal additives when the grafted stabilisers masterbatch is diluted down by virgin polymer to the required stabiliser concentrations typically used for this purpose during the second cross-linking step, at which point other stabilisers may also be added. The diluted stabiliser masterbatch concentration is generally 0.01% to 5% but preferably 0.1% to 0.5% by weight based on the total weight of virgin polymer and masterbatch. In embodiments, the resulting cross-linked product has an exceptional degree of stabiliser retention and stability at elevated temperatures.

Suitably the polymer stabiliser comprises a polymer-graftable group and a polymer stabilising group. As noted above, the terms stabiliser and antioxidant are used interchangeably in the art and the interchangeable terms "polymer stabilising group" and "polymer antioxidant group" will be familiar to the skilled reader.

As noted above, in embodiments high levels of thermal oxidative stability can be achieved because the polymer stabilising group retains its activity after grafting in the cross-linked polymer.

A suitable polymer-graftable group is a polymerisable group (PG) or non-polymerisable group (nPG) (i.e. selected from a group which provides a polymerisable function and a group which provides a non-polymerisable graftable function). Suitable examples of PG and nPG include those set out below. For example, preferably the polymer stabiliser comprises a PG group which contains a polymerisable carbon-carbon double bond, suitably an acryloyl group.

The antioxidant group (Y) (i.e. the group providing the antioxidant function) can be selected from any suitable antioxidant function, which antioxidant functions are known to the skilled reader. Suitable examples of Y include those set out below.

Suitably the polymer stabiliser is a compound Y—W, wherein W is PG or nPG as defined herein.

Suitably the polymer stabiliser comprises a polymerisable graftable function PG and an antioxidant function Y. In embodiments, the polymer stabiliser is a compound PG-Y, preferably selected from the following:

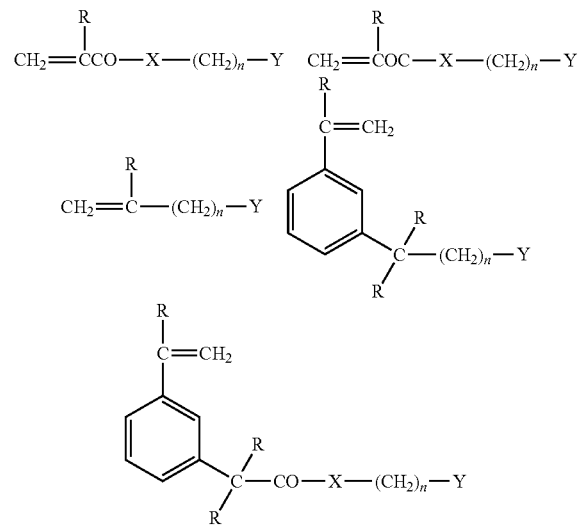

wherein
  each R is independently H, alkyl (preferably $C_{1-6}$alkyl, more preferably $C_{1-4}$alkyl), arylalkyl (preferably $C_{5-15}$aryl-$C_{1-6}$alkyl, more preferably $C_{6-12}$aryl$C_{1-4}$alkyl), alkoxyl (preferably $C_{1-6}$alkoxy, more preferably $C_{1-4}$alkoxy), arylalkoxy (preferably $C_{5-15}$aryl-$C_{1-6}$alkoxyl, more preferably $C_{6-12}$aryl$C_{1-4}$alkoxyl) or OH;
  each R' is independently H, alkyl (preferably $C_{1-6}$alkyl, more preferably $C_{1-4}$alkyl), arylalkyl (preferably $C_{5-15}$aryl-$C_{1-15}$alkyl, more preferably $C_{6-12}$aryl$C_{1-4}$ alkyl), alkoxyl (preferably $C_{1-6}$alkoxy, more preferably $C_{1-4}$alkoxy), arylalkoxy (preferably $C_{5-15}$aryl-$C_{1-6}$alkoxyl, more preferably $C_{6-12}$aryl$C_{1-4}$alkoxyl) or OH;

X is independently O, NH, NR or S;

n is independently zero or an integer from 1 to 18; and

Y is independently an antioxidant group as defined herein,

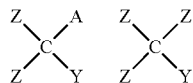

wherein
- Z is independently a graftable (PG) or non-graftable (nPG) group as described herein;
- A is independently H, OH, OR, NHR, $NH_2$, $NR_2$, COOH or $(CH_2)_n$COOH;
  - wherein each R is independently as defined above; and
- Y is independently as defined above, and

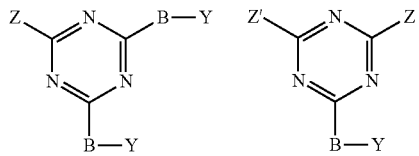

wherein
- Z is independently a graftable (PG) or non-graftable (nPG) group as described herein;
- Z' is independently H or a graftable (PG) or non-graftable (nPG) group as described herein;
- B is independently NH, NY or NR";
  - wherein $R^N$ is independently aryl, preferably $C_{5-15}$aryl, more preferably $C_{6-12}$aryl, benzyl or $(CH_2)_n$Y; and
  - wherein n is independently as defined above;
- each R is independently as defined above; and
- each Y is independently as defined above.

Some of the compounds described above may comprise a nPG group instead of or as well as a PG group, as is clear from the definitions of Z and Z'. Accordingly, those compounds can also be examples of compounds of the form nPG-Y.

Suitably the polymer stabiliser comprises a non-polymerisable function nPG and an antioxidant function Y. In embodiments, the polymer stabiliser is a compound nPG-Y, preferably selected from the following:

D'-OCCH=CH—CO-D, maleate and fumarate wherein
- D is independently $NR_2$, OR or R;
  - wherein each R is independently as defined above;
- D' is independently OY, NRY or $NY_2$;
  - wherein R is independently as defined above; and
  - wherein each Y is independently as defined above.

Suitably D can be the same as D' or different.

A suitable polymer stabiliser group Y (the group that provides the antioxidant/stabiliser function) that can be used in this invention is based on any class of antioxidants, and one of skill in the art knows what is meant by antioxidant classes, which essentially include functions exemplified by, but not limited to, the structures of hindered phenols, hindered amines or piperidenes, aromatic amines, hydroxybenzophenones, hydroxybenzotriazines, lactones, phosphites, sulphides.

Thus, preferably Y is selected from a hindered phenol, a hindered amine, a hydroxybenzophenone, a hydroxybenzotriazole, an aromatic amine and a phosphite. Typical examples include those set out below.

In embodiments, the polymer stabiliser is selected from the following:

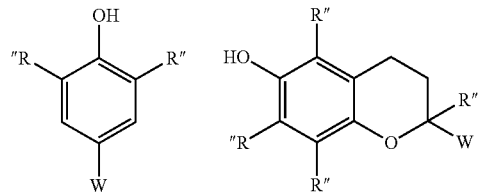

wherein
- each R" is independently primary, secondary or tertiary alkyl (preferably $C_{1-6}$alkyl, more preferably $C_{1-4}$alkyl, suitably selected from $^t$butyl, $^i$propyl and methyl), $CH_2Y$ or
  OCOCH=$CH_2$

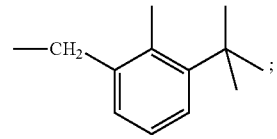

and
- W is independently graftable function PG or nPG as defined herein.

In embodiments, W in the above compounds can be independently H, alkyl (preferably $C_{1-6}$alkyl, more preferably $C_{1-4}$alkyl), arylalkyl (preferably $C_{5-15}$aryl-$C_{1-6}$alkyl, more preferably $C_{6-12}$aryl$C_{1-4}$alkyl), alkoxyl (preferably $C_{1-6}$alkoxy, more preferably $C_{1-4}$alkoxy), arylalkoxyl (preferably $C_{5-15}$aryl-$C_{1-6}$alkoxyl, more preferably $C_{6-12}$aryl$C_{1-4}$alkoxyl), amino or OH. Thus, for example, if the graftable function is provided by one or more of the other groups in the compound, W need not be graftable.

In embodiments, the polymer stabiliser is selected from the following:

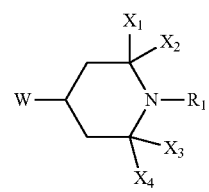

wherein
- each of $X_1$, $X_2$, $X_3$ and $X_4$ is independently alkyl (preferably $C_{1-6}$alkyl, more preferably $C_{1-4}$alkyl and most preferably methyl)
- $R_1$ is independently as defined above for R and optionally also selected so that together with the ring Nitrogen to which it is attached it is an unsaturated ester or unsaturated amide, preferably having the structure:

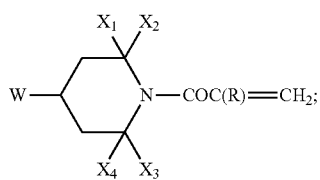

and

W is independently as defined above.

In embodiments, the polymer stabiliser is selected from the following:

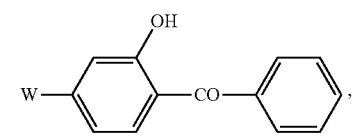

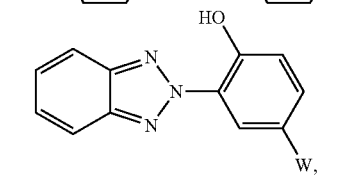

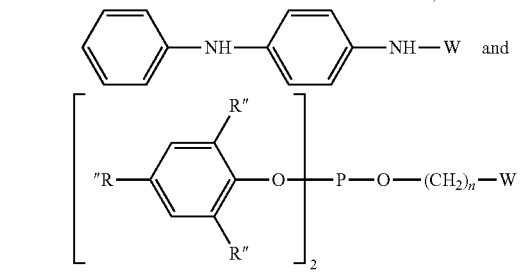

wherein

W is independently as defined above;

n is independently as defined above; and

R″ is independently as defined above.

In the present invention, a number of polymer graftable stabilisers were found to be particularly effective, and preferably the polymer graftable stabiliser is one or more selected from:

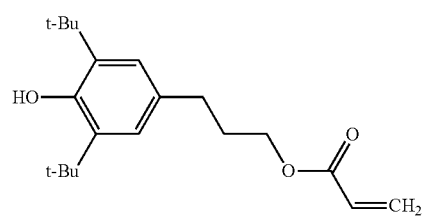

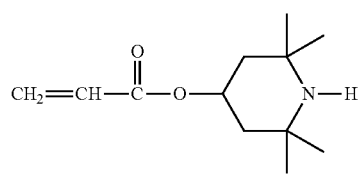

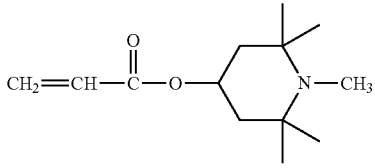

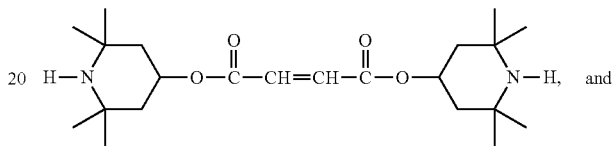

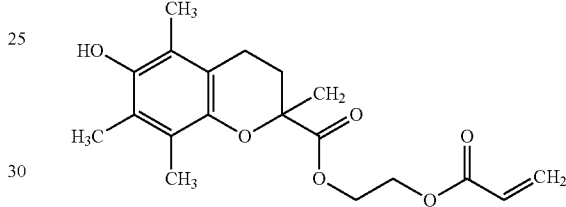

In embodiments, two or more graftable stabilisers are used. Combinations of DBPA and one or more of AOTP, AOPP, AATP, DPM, or with any other conventional, non-graftable, stabiliser in particular of the HAS or hindered phenol structures are particularly preferred.

Suitably the stabiliser is used in an amount of at least 0.1% to 3%, preferably 0.1% to 2%, more preferably 0.3% to 1%, more preferably 0.3% to 0.8% and most preferably about 0.5% by weight, based on total weight of stabiliser and polymer. As noted above, if a high concentrate is prepared in a first step of the two step embodiment then up to 40%, for example about 10%, by weight stabiliser concentrate can be prepared which can then be diluted down to the required concentration.

Suitably the step of grafting the polymer stabiliser onto the polymer includes grafting by a free-radical mechanism. Suitably a source of free-radicals, typically a free-radical initiator, is used.

In embodiments, the chemical free-radical initiator is the same as the cross-linking agent used in the step of cross-linking. In further embodiments, a different free-radical initiator is used in each step.

The cross-linking process is suitably a free radical-induced process using one of various possible agents including chemical agents such as organic peroxides, azo-based compounds, or physical agent including high energy radiation such as e-beam, UV-radiation.

Suitably the step of cross-linking includes cross-linking with a chemical cross-linking agent. Preferably the chemical cross-linking agent is a free-radical initiator, preferably a peroxide. Another suitable chemical cross-linking agent is a silicon-containing compound, typically a silane and preferably a vinyl silane. In the case of a silicon-containing compound, preferably a cross-linking catalyst is used. For example the cross-linking catalyst can be a tin catalyst such as dibutyltinlaurate (DBTDL).

Suitably the cross-linking agent is selected from
(a) a peroxide or azo-compound;
(b) a high energy radiation such as electron beam
(c) a silicon-containing compound.

That is, a preferred cross-linking agent is at least one of (a) and (b).

In the case of (a) preferably the peroxide, which can be used as cross-linking agent and may also be used as radical initiator for grafting, is selected from, but not limited to:
2-t-butylperoxy-2-methylpropane
2,5-dimethyl-2,5-bis(tert-butylperoxy)hexane
2,5-Dimethyl-2,5-di(tert-butylperoxy)hexyne-3
Di-cumyl peroxide
Di-tertiary-butyl peroxide
α,α☐-di(t-butyl-peroxy)-1,3- and 1,4-di-isopropyl-benzene
t-butyl α-cumyl peroxide In the case of (c), suitably the silicon-containing compound is a silane, preferably a vinyl silane.

In embodiments the step of cross-linking includes cross-linking with radiation. Use of an electron beam is particularly preferred.

Preferably the step of cross-linking includes cross-linking to achieve a degree of cross-linking of at least 25%, preferably at least 50%, more preferably at least 60% and most preferably at least 70%, with a preferred range being 50% to 90% and preferably 70% to 85%. Suitably the extent of cross-linking is measured by xylene Soxhlet extraction according to ASTM 2765-01, as demonstrated in the examples herein.

Thus, the present invention provides a method of making stabilised cross-linked polymers that are suitable for use with, for example, cold and hot water portable drinking supplies. As the skilled reader is aware, pipes for the most demanding applications such as portable hot water pipes have a degree of cross-linking in excess of 70% and these applications are particularly preferred. However, the advantages of the invention can also be realised in embodiments where the environment is less demanding, for example impact and scratch resistant cold water pipes, which can have a degree of cross-linking as low as 25%. Thus, embodiments of the present invention are concerned with improvements to the potential migration, toxicity and hygiene problems associated with loss of stabilisers from the polymer, for example from cold water pipes as well as the specific more demanding problems associated with portable hot water pipes.

In particularly preferred embodiments a graftable polymer stabiliser and a chemical cross-linking agent, suitably a peroxide, are added to the thermoplastic starting material, suitably in a melt, and the resultant mixture is processed in the melt to achieve grafting of the stabiliser and cross-linking of the polymer. Suitably this is achieved using an internal mixer or extruder.

Suitably one or more conventional (i.e. non-graftable) stabilisers are incorporated into the polymer.

Preferably the method is a method of making a pipe. Thus, suitably the method includes the step of forming the polymer into a pipe. Suitably a stabilised polymer formulation is extruded from a melt and cross-linked during the pipe forming process. Alternatively the polymer formulation is formed into a pipe profile and simultaneously cross-linked. In a yet further alternative, the formulation can be partially cross-linked, then formed into a pipe profile and subsequently cross-linked to a final degree.

Preferably the pipe is a hot water pipe. As discussed above, hot water pipes are exposed to demanding conditions during use and embodiments of the present invention provide a robust and stable material suitable for making such pipes.

Pipes according to this invention can ideally be utilised in drinking water installations, in particular because the overall migration levels are lower than conventional plastic pipes for these purposes.

Typical pipes for domestic hot water application have outer diameters in the range of 10 to 63 mm, however in large buildings pipes up to 160 mm diameter may be used. In district heating pipes (that is, pipes used externally for water distribution) diameters up to 400 mm or 500 mm are used. In industrial applications like on shore and off shore polyolefin liner pipes exist up to 2 m in diameter.

In embodiments, the pipe is a domestic hot water supply pipe, preferably having an outer diameter in the range 8 mm to 65 mm, more preferably 10 mm to 63 mm.

In other embodiments, the pipe is a building hot water supply pipe, preferably having an outer diameter in the range 10 mm to 180 mm, more preferably 65 mm to 180 mm.

In further embodiments, the pipe has an outer diameter in the range 500 mm to 2.5 m, more preferably 500 mm to 2 m.

In embodiments, the method of producing PEXa pipe is the Engel method except that a graftable polymer stabiliser is used. Thus, in a further aspect, the present invention provides a method of producing PEX using the Engel method, wherein the stabiliser system contains at least one or more stabilisers that is a graftable antioxidant.

In embodiments the pipe is a multilayer pipe wherein at least one of the layers is the cross-linked stabilised polymer described herein. Suitably the cross-linked stabilised polymer layer is an innermost layer that is in contact with fluid carried by the pipe in use.

That is, in embodiments the cross-linked stabilised pipe may be a single-layer pipe a multi-layer pipe comprising the cross-linked stabilised polymer layer and further layers of other pipe material composition.

An example of a multi-layer pipe is a PEX-AL-PEX composite wherein an aluminium layer is laminated between two layers of plastic. This provides improved pressure resistance as compared to PEX alone.

In embodiments, the pipe conforms to one or both of North American standards ASTM F876 and ASTM F877 and is suitable for use as a portable water pipe. Additionally or alternatively, the pipe conforms to the EN ISO 15875 series of standards.

In a further aspect, the present invention provides a stabilised cross-linked polymer made by the method of the present invention.

In a further aspect, the present invention provides a pipe comprising a stabilised cross-linked polymer made by the method according to the present invention.

In a further aspect, the present invention provides a stabilised cross-linked thermoplastic polymer having a degree of cross-linking of at least 25%, wherein the polymer comprises stabiliser groups grafted to the polymer.

Suitably the degree of cross-linking is at least 50% and more preferably 70 to 85%.

Suitably the polymer comprises stabiliser in an amount of 0.1% to 3% and more preferably 0.3% to 1% and most preferably about 0.5% by weight based on total weight of the polymer.

Preferably the polymer, when extracted with dichloromethane (DCM), retains at least 60%, more preferably at least 80%, and even more preferably 90% or greater of the stabiliser. Suitably, the extent of stabiliser retained in the polymer is measured by FTIR, as demonstrated in the experiments herein.

Preferably the polymer, when measured at 190° C. according to ASTM D3895-03, has an oxidative induction time (OIT) retention after exhaustive solvent extraction using dichloromethane as a solvent, of at least 60%, and preferably at least 70% or more of the OIT as measured before extraction. In other words, preferably the OIT after solvent extraction is at least 60% and preferably at least 70% of the OIT prior to solvent extraction.

In a further aspect, the present invention provides a cross-linked thermoplastic polymer having a degree of cross-linking of at least 25%, the polymer comprising stabiliser in an amount of 0.1% to 3% by weight based on total weight of the polymer, wherein the polymer or pipe, when extracted with dichloromethane (DCM), retains at least 60%, more preferably at least 70% and most preferably at least 90% or above, of the stabiliser prior to extraction.

In a further aspect, the present invention provides a cross-linked thermoplastic polymer comprising a cross-linked polymer having a degree of cross-linking of at least 25%, the polymer comprising stabiliser in an amount of 0.1% to 3% by weight based on total weight of the polymer, wherein the polymer, when extracted with dichloromethane (DCM), has an OIT of at least 60%, more preferably at least 70% of the OIT as measured before extraction.

In a further aspect, the present invention provides a pipe comprising the cross-linked thermoplastic polymer of any one of the aspects described above. Suitably the pipe is a PEX pipe, preferably a portable water PEX pipe and most preferably a portable hot water PEX pipe.

Any one of the aspects of the present invention may be combined with any one or more of the other aspects of the present invention. Furthermore, any one or more of the features of one aspect may apply to any of the other aspects. In particular, features disclosed herein with explicit reference to a method suitably also apply to a product, and vice versa. Thus, for example, features such as degree of cross-linking or retention of stabiliser described with reference to a method suitably also apply to the product, for example a polymer or pipe.

The present invention is illustrated by the following experiments and examples.

Determination of Antioxidant Retention

In order to determine antioxidants retention, in this case for PEXa, thin films of crosslinked polymer samples, or commercial pipe samples, were compression moulded and analysed for the AO's content using FTIR spectroscopy.

Film samples of 2×3 cm² size and thickness 200-250 μm of crosslinked polymer samples were first analysed by FTIR to evaluate antioxidant concentration and DSC was used to determine OIT. Subsequently, films were exhaustively Soxhlet extracted in dichloromethane (DCM) under nitrogen for 48 h in order to remove any removable antioxidants and any other low molecular mass materials. Dichloromethane has been found to be a suitable extraction solvent for antioxidants, for example it dissolves all of the antioxidants used in the examples below. The extracted films were dried at room temperature in a vacuum oven overnight and analysed by FTIR for AO content. All samples were analysed in at least triplicates.

The polymer films were analysed by FTIR spectroscopy with spectra obtained over the range 4000 cm$^{-1}$ to 400 cm$^{-1}$ for 16 scans with a resolution of 4 cm$^{-1}$. The IR spectra of compression moulded crosslinked polyethylene samples (PEXa) containing antioxidants were recorded and the carbonyl group absorption area was evaluated so that the concentration of antioxidants (Irganox 1076; DBPA) can be determined from an IR calibration curve. The antioxidant retention (based on triplicate samples) was obtained by comparing the mass of antioxidant after extraction with the mass of antioxidant remaining in the polymer prior to extraction (i.e. after the crosslinking process). The percentage retention was calculated according to the following definition:

% Retention is the percentage ratio of the amount of an antioxidant that is retained in the polymer after extraction in DCM (48 h under N$_2$ atmosphere) to the amount of the same antioxidant remaining after processing (actual concentration).

$$\text{Retention (\%)} = \frac{\text{Mass of } AO \text{(after } DCM \text{ extraction)}}{\text{Mass of } AO \text{ remaining after processing}} \times 100\% \quad (1)$$

In order to determine the mass of antioxidants, e.g. DBPA, and the amount remaining in polymer samples after the crosslinking process, a calibration curve based on FTIR of the carbonyl absorption peak area of the antioxidant (or another specified absorption if the antioxidant does not have a carbonyl group) was constructed vs the antioxidant concentration as described below. For DBPA and Irganox 1076 (which have a carbonyl group absorption), solutions of each antioxidant in 1,1,2,2-tetrachloroethane with exact concentrations (2 g/100 cm³, 3 g/100 cm³, 4 g/100 cm³, 5 g/100 cm³, 6 g/100 cm³) were prepared in 5 ml volumetric flasks and analysed by FTIR. The solutions were injected in a KBr liquid cell containing a spacer of thickness 100 μm. Each solution was analysed three times and every time a new portion of the solution was injected before recording its FTIR spectrum. The carbonyl peak absorbance area from each spectrum was calculated and a graph of an absorbance peak area vs concentration was plotted. The calibration curves were used to calculate the mass of AO concentration remaining after processing or after crosslinking. For calculation of AO (e.g. DBPA) conc. in PEX samples the following steps were used.

$$A_{>C=O(1680-1800)} = (\text{peak area absorbance of carbonyl group} > C = O) \quad (3)$$

$$A_{corrected \text{ for polymer film}} = \frac{A_{>C=O(1680-1800)film} \times 100 \text{ μm}}{\text{thickness of the polymer film sample (μm)}} \quad (4)$$

Subsequently from calibration curve, y=3.457x+0.053 where:

$$y = > C = O \text{ absorbtion peak area; } A_{(1680-1800)} \quad (5)$$

$$x = [DBPA]_{g/100 \text{ ml}} DBPA_{(g/100 \text{ ml})} = \frac{A_{corrected} - 0.053}{3.457}$$

$$DBPA_{(g/100 \text{ g})} = \frac{DBPA_{(g/100 \text{ ml})}}{d} \quad (6)$$

where:

$A_{(1680-1800)}$=carbonyl group peak area absorbance of the analysed sample $A_{corrected}$=carbonyl group peak area absorbance of the sample with value corrected to the thickness of 100 μm $DBPA_{(g/100 \text{ ml})}$=DBPA conc. in the polymer calculated from the calibration curve equation: y=3.457x+0.053 (g/100 ml)

$DBPA_{(g/100 \text{ g})}$=DBPA conc. in the polymer (g/100 g)

d=density of the polymer—HDPE (0.965 g/cm³)

The concentration of DBPA obtained from above calculations, was then used to calculate the retention of DBPA in polymer samples.

EXAMPLES

Example 1

A grafted and cross-linked polyethylene (PEXa) composition was prepared in two-step process where the antioxidant grafting step was done first followed by the cross-linking step. In the first step, a mixture of unstabilised high density polyethylene, HDPE, the graftable hindered phenol antioxidant 3-(3',5'-di-tert.-butyl-4'-hydroxy phenyl)propyl-1-acrylate (DBPA) used at a weight ratio of DBPA to HDPE of 3:97, and the peroxide 2,5-dimethyl-2,5-bis(tert-butylperoxy)hexane (T101) used at a molar ratio of T101 to DBPA of 0.04:1, was prepared by pre-mixing and processing in an internal mixer at 180° C. The reaction time was 10 minutes. 18 grams of the product containing the grafted stabiliser was then mixed with 81.5 grams of unstabilised HDPE and 0.5 grams of the conventional hindered amine stabiliser poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]] (Chimassorb 944®) in order to give a final concentration of the grafted stabiliser of 0.5 weight percent, and homogenised in an internal mixer at low temperature of 140° C. for 10 minutes. In the second step the homogenised mixture was pre-mixed with 0.5 weight percent of the cross-linking agent, 2-tert-butylperoxy-2-methylpropane (TB) and cross-linked by compression moulding at a temperature of 240° C. under pressure of 22 kg/cm$^2$ for 7 minutes.

The extent of cross-linking in the polymer was determined by xylene Soxhlet extraction according to ASTM 2765-01. The oxidative induction time, OIT, used as a measure of long term thermal stability, LTTS, of the composition was measured at 190*C according to ASTM D3895-03 using a Differential Scanning calorimeter (DSC) instrument as an average of triplicate samples. The amount of grafted stabiliser that remains after extraction with methylene dichloride of the cross-linked polymer (PEXa) was estimated by FTIR spectroscopy. This was found to be 100% of the amount present before cross-linking and no DBPA could be detected in the extracting solvent. The extent of cross-linking was found to be 84% and the OIT was greater than 750 minutes. Compared to a PEXa sample prepared with HDPE containing the typically used non-graftable commercial hindered phenol antioxidant Irganox 1076® which gave an OIT of 35 minutes only (see comparative example 1 below) the PEXa sample of this example shows clearly an excellent resistance to oxidation with a very significant improvement in its LTTS compared to the sample containing the conventional stabiliser Irganox 1076®.

Example 2

A grafted and cross-linked polyethylene (PEXa) composition was prepared in one-step process where the antioxidant grafting step and the cross-linking step were carried out at the same time. A mixture of unstabilised high density polyethylene, HDPE, 0.5 weight percent of each of the graftable antioxidants DBPA and the hindered amine AOPP and 0.5 weight percent of a cross-linking agent, the peroxide 2,5-di(tert-butylperoxy)hexyne)-2,5-dimethylhexyne (T145), was pre-mixed and compression moulded at a temperature of 240° C. under pressure of 22 kg/cm$^2$ for 7 minutes. The extent of cross-linking of this sample was found to be 84% and the OIT was found to be 250 minutes.

Comparative Example 1

A cross-linked polyethylene (PEXa) composition stabilised with the conventional hindered phenol Irganox 1076® was prepared for comparison. A mixture of unstabilised high density polyethylene, HDPE, 0.5 weight percent of Irganox 1010® and 0.5 weight percent of a cross-linking agent, the peroxide TB, was homogenised in an internal mixer at low temperature of 150° C. for 5 minutes cross-linking by compression moulding at a temperature of 240° C. under pressure of 22 kg/cm$^2$ for 7 minutes. The extent of cross-linking of this sample was found to be 81% and the OIT was found to be 35 minutes only. A similar polymer sample containing 0.5 weight percent Irganox 1076 but which was not cross-linked was found to give an OIT of 165 minute showing that only 21 percent of the stabiliser performance was retained after cross-linking.

Comparative Example 2

Comparative example 1 was repeated, also for comparison, but Irganox 1076® was replaced by another conventional hindered phenol Irganox 1010® which has a larger molecular weight than Irganox 1076. The extent of cross-linking of this sample was found to be 80% and the OIT was found to be 75 minutes. A similar polymer sample containing 0.5 weight percent Irganox 1076 but which was not cross-linked was found to give an OIT of 450 minute showing that only 17 percent of the stabiliser performance was retained after cross-linking.

Example 3

Example 1 was repeated except only one stabiliser, the grafted DBPA, was used at a final concentration of 1 weight percent in the polymer. The extent of cross-linking was found to be 71% and the OIT was 115 minutes. A similar polymer sample containing the same amount of DBPA but which was not cross-linked was found to give the same OIT of 115 minute indicating that there is no loss in the performance of the grafted stabiliser after cross-linking, 100 percent retention of LTTS stability in the cross-linked polymer, and this drastically contrasts the behaviour of the conventional hindered phenol stabilisers in similarly cross-linked polymer samples as is illustrated above in comparative examples 1 and 2.

Example 4

Example 1 was repeated except two graftable stabilisers DBPA and AOPP were used at a final concentration of 1 weight percent each in the polymer. The extent of cross-linking was found to be 71% and the OIT was 110 minutes. A similar polymer sample containing the same amount of DBPA and AOPP but which was not cross-linked was found to give an OIT of 130 minute showing that over 88 percent of the stabilisers activity is retained after cross-linking.

Example 5

Example 4 was repeated but AOPP was replaced with the same amount of AOTP. The extent of cross-linking was found to be 73% and the OIT was 245 minutes.

Example 6

Example 2 was repeated but the cross-linking agent T145 was replaced with the peroxide T101. The extent of cross-linking was found to be 80% and the OIT was 190 minutes.

Example 7

Example 2 was repeated but the cross-linking agent T145 was replaced with the peroxide TB and the mixture was homogenised in an internal mixer at low temperature of 145° C. for 5 minutes before cross-linking. The extent of cross-linking was found to be 82% and the OIT was 255 minutes.

Example 8

Example 2 was repeated but AOPP was replaced with AATP. The extent of cross-linking was found to be 77% and the OIT was 190 minutes.

Example 9

A grafted and crosslinked polyethylene (PEXa) pipe was prepared in one step by extrusion using the Engel process where the pipe size was 16/2-16 mm outer diameter and have a wall thickness of 2 mm.

A one kg total mixture of unstabilised high density polyethylene, HDPE, the graftable hindered phenol antioxidant 3-(3',5'-di-tert.-butyl-4'-hydroxy phenyl)propyl-1-acrylate (DBPA) used at a 0.5 w/w % and 0.5 w/w % of the graftable hindered amine AOPP were first soaked together in hexane for uniform distribution of the antioxidants in the polymer followed by complete evaporation of the solvent at room temperature. The crosslinking agent, tertiary butyl peroxide, used at 0.4% was then added to the polymer composition, and the mixture was stored in a sealed container overnight for uniform distribution and soaking of the peroxide (without a solvent) in the polymer. The crosslinking process was then achieved in the Engel processing machine at the following set conditions: cylinder block at 110° C., Electric heating (only used for start up): 150° C., bushing and mandril pin at 250° C. and set line speed: 260 m/h.

The oxidative induction time, OIT, used as a measure of long term thermal stability, LTTS, of the composition was measured at 190° C. according to ASTM D3895-03 using a Differential Scanning calorimeter (DSC) instrument and measurements were based on an average of four tested samples. The amount of grafted stabiliser that remains after extraction with methylene dichloride of the cross-linked polymer (PEXa), defined as % retention of stabiliser, was determined from FTIR spectroscopy as described above. Four samples about 2 cm long each were cut out randomly from the pipe, divided into two parts by cutting vertically in the middle and subsequently pressed using a hot press for 2 minutes without any pressure followed by 5 minutes with full pressure of 22 kg/cm$^2$ at a temperature of 160° C. to obtain film samples 200-250 µm thick for OIT analysis. The OIT of this PEXa pipe sample before extraction was 175 min. and after extraction was 174 min. giving a total antioxidant retention of 99%. The extent of cross-linking was found to be 86%.

Comparative Example 3

Example 9 was repeated but instead of using the graftable antioxidants, a 0.5 weight percent of the conventional hindered phenol antioxidant Irganox 1076® was used instead, and a crosslinked pipe was produced by the Engel process under the same conditions described in example 9. The OIT of this pipe before extraction was 98 min. but after extraction it was reduced down to 14 min. giving an antioxidant retention of only 14%. The extent of cross-linking was found to be 93%.

Example 10

Example 9 was repeated but AOPP was replaced with the same amount of Chimassorb 944 and the cross-linking agent tertiary butyl peroxide was replaced with the peroxide T145. The extent of cross-linking for this sample was found to be 83% and the OIT of the PEXa pipe sample before extraction in methylene dichloride (DCM) was greater than 800 minutes and after extraction remained greater than 800 min. giving a total antioxidant activity retention of 100%. The amount of grafted antioxidant (DBPA) remaining in the pipe sample after DCM extraction, as measured by FTIR spectroscopy, was 99%. This contrasts with the behaviour of a pipe produced in a similar way but with the conventional hindered phenol, Irganox 1076, which gives only 14% retention in the stabiliser activity after extraction, as mentioned in Comparative Example 3.

Example 11

Example 9 was repeated but the peroxide cross-linking agent was replaced with the peroxide T145. The extent of cross-linking for this sample was found to be 83% and the OIT of the PEXa pipe sample before extraction in DCM was 188 minutes and after extraction was 145 min. giving a total retention of antioxidant activity in the pipe of 77%.

Example 12

Example 11 was repeated but AOPP was replaced with the same amount of AOTP. The extent of cross-linking for this sample was found to be 85% and the OIT of the PEXa pipe sample before extraction in DCM was 162 minutes and after extraction was 126 min. giving a total retention of antioxidant activity in the pipe of 78%.

The invention claimed is:

1. A method of making a stabilised cross-linked polymer from a thermoplastic polymer, the method comprising grafting at least one polymer stabiliser on to the polymer and cross-linking the polymer to a degree of at least 25%.

2. A method according to claim 1, wherein the method is a one-step process wherein grafting and cross-linking occur in one step at substantially the same time.

3. A method according to claim 1, wherein the method includes incorporating at least one additional polymer stabiliser into the polymer.

4. A method according to claim 1, wherein the polymer stabiliser comprises a polymer-graftable non-polymerisable group.

5. A method according to claim 1, wherein the polymer stabiliser comprises a polymer stabilising group selected from a hindered phenol and a hindered amine.

6. A method according to claim 1, wherein the polymer stabiliser is selected from DBPA, AOTP, AOPP, AATP, DPM and gE.

7. A method according to claim 1, wherein the stabilised cross-linked polymer has a degree of cross-linking of 50% to 90%.

8. A stabilised cross-linked polymer made by the method of claim 1.

9. A pipe comprising a stabilised cross-linked polymer made by the method according to claim 1.

10. A method according to claim 1, wherein the method is a two-step process wherein the grafting step occurs before the cross-linking step.

11. A method according to claim 10, wherein a masterbatch of the grafted stabiliser is formed in the polymer which is then diluted down to a lower concentration followed by the cross-linking step.

12. A method according to claim 1, wherein the polymer is a polyolefin.

13. A method according to claim 12, wherein the polyolefin is polyethylene.

14. A method according to claim 13, wherein the polyethylene is HDPE.

15. A method according to claim 1, wherein the polymer stabiliser comprises a polymer-graftable polymerisable group.

16. A method according to claim 15, wherein the polymer stabiliser comprises an acryloyl group.

17. A method according to claim 1, wherein cross-linking includes cross-linking with a chemical agent or radiation.

18. A method according to claim 17, wherein cross-linking includes cross-linking with a peroxide.

19. A method according to claim 18, wherein the peroxide is selected from T145, TB, T101 and dicumyl peroxide.

20. A method according to claim 17, wherein cross-linking includes cross-linking with high energy radiation such as electron beam.

21. A method according to claim 1, wherein the method includes the step of forming a pipe, such that the pipe comprises the stabilised cross-linked polymer.

22. A method according to claim 21, wherein the pipe is a water pipe.

23. A method according to claim 7, wherein the polymer is polyvinyl chloride or a polyolefin.

24. A method according to claim 23, wherein the polymer is polyethylene.

25. A method according to claim 24, wherein the polymer stabiliser comprises an acryloyl group, a hindered phenol or a hindered amine.

26. A method according to claim 24, wherein the polymer stabiliser is selected from DBPA, AOTP, AOPP, AATP, DPM and gE.25.

27. A method according to claim 23, wherein the polymer stabiliser comprises an acryloyl group, a hindered phenol or a hindered amine.

28. A method according to claim 23, wherein the polymer stabiliser is selected from DBPA, AOTP, AOPP, AATP, DPM and gE.25.

29. A cross-linked thermoplastic polymer comprising a cross-linked polymer having a degree of cross-linking of at least 25%, the polymer comprising stabiliser in an amount of 0.1% to 3% by weight based on total weight of the polymer, wherein the polymer, when measured at 190° C. according to ASTM D3895-03, has an oxidative induction time (OIT) retention after solvent extraction using dichloromethane (DCM) as a solvent, of at least 60% of the OIT prior to solvent extraction.

30. A cross-linked thermoplastic polymer having a degree of cross-linking of at least 25%, the polymer comprising stabiliser in an amount of 0.1% to 3% by weight based on total weight of the polymer, wherein the polymer or pipe, when extracted with dichloromethane (DCM), retains at least 60% of the stabiliser prior to extraction.

31. A method for making a stabilised cross-linked polymer from a thermoplastic base polymer, the method comprising (1) grafting at least one polymer stabiliser onto the thermoplastic base polymer and thereafter (2) cross-linking the thermoplastic base polymer to a degree of at least 25%.

32. A method for making a stabilised cross-linked polymer from a thermoplastic base polymer, the method comprising (1) subjecting a mixture of the thermoplastic base polymer and a graftable stabilizer capable of grafting onto the thermoplastic base polymer to reaction conditions capable of causing the graftable stabilizer to graft onto the thermoplastic base polymer as well as cross-link the thermoplastic base polymer and (2) discontinuing the reaction conditions when the degree of cross-linking of the thermoplastic base polymer is at a level of 50% to 90%.

* * * * *